Oct. 15, 1935. C. GATEWOOD 2,017,277
FILTER
Filed June 7, 1934
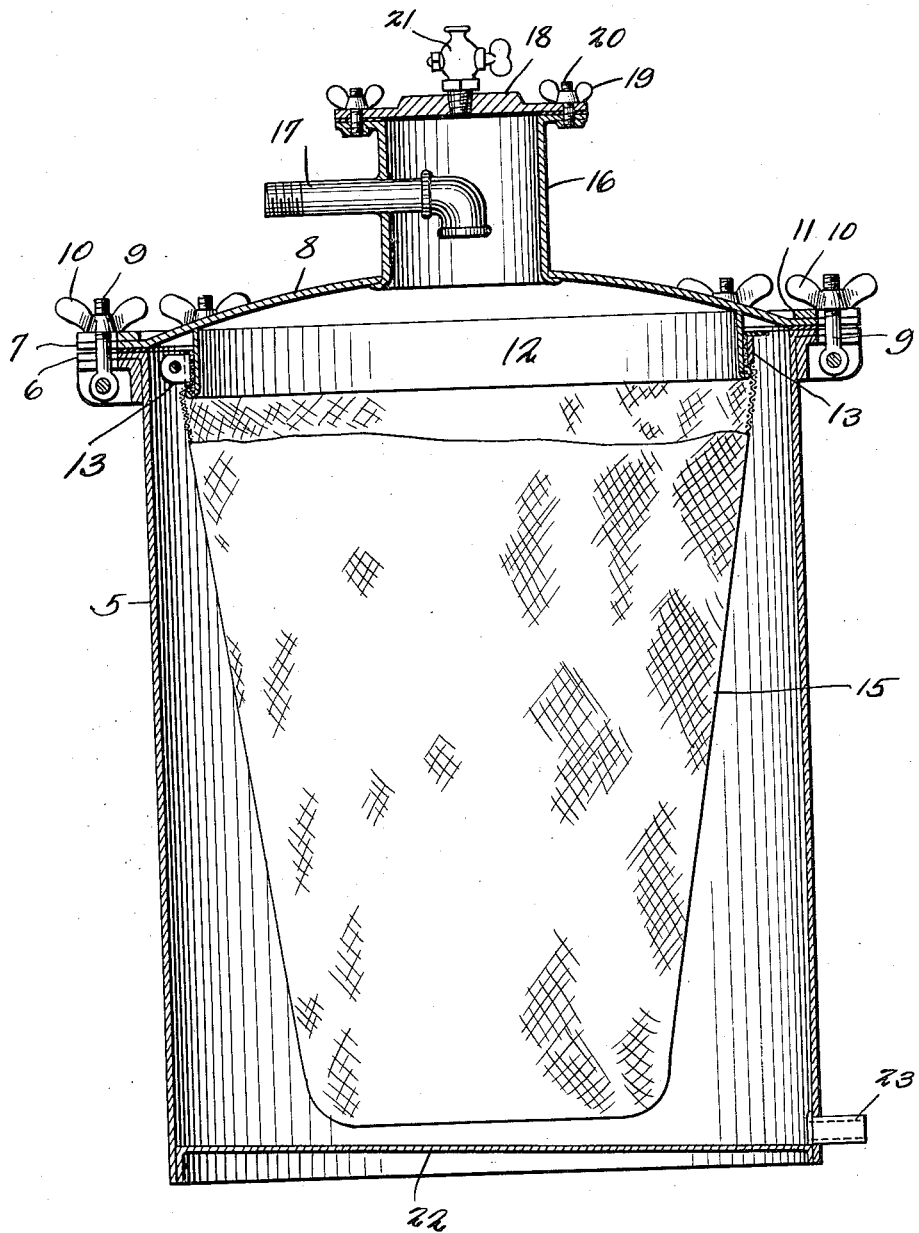
Crutchfield Gatewood
Inventor
By C. A. Snow & Co.
Attorneys.

Patented Oct. 15, 1935

2,017,277

UNITED STATES PATENT OFFICE 2,017,277

FILTER

Crutchfield Gatewood, Louisville, Ky.

Application June 7, 1934, Serial No. 729,486

1 Claim. (Cl. 210—155)

This invention relates to filters, designed primarily for use in filtering spirituous liquors, vinegar or the like liquids, whereby charcoal or other foreign matter may be removed therefrom.

An important object of the invention is to provide a filter of this character wherein the filtering member may be readily removed and replaced, to the end that when the filtering member becomes clogged, a clean filtering member may be readily substituted therefor, and the filter immediately placed back in use.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

The figure illustrates a vertical sectional view through a filtering device constructed in accordance with the invention.

Referring to the drawing in detail, the reference character 5 designates the body portion of the filter, which is preferably circular in formation.

At the upper end of the body portion is an annular outwardly extended flange 6 on which the flange 7 of the cover 8 of the filter rests, the flange 7 being formed with slots extending from the edge thereof, to accommodate the swinging bolts 9 that are supplied with winged nuts 10, whereby the cover 8 may be clamped in position on the body portion.

A seal ring 11 is positioned on the flange 7 and is engaged by the winged nuts 11, when the cover is secured on the body portion.

Secured to the cover 8, and depending therefrom in spaced relation with the edge of the cover, is an annular flange 12 that has its free edge rolled upwardly providing a shoulder against which the securing band 13 rests, when the securing band is tightened on the flange, to secure the filtering member indicated at 15, in position.

Extending from the cover 8, is a tubular member 16 formed with an opening through which the inlet pipe 17, extends, and through which the liquid being filtered, passes to the interior of the body portion.

A cover 18 is provided on the tubular member 16, and is held in position by means of the winged nuts 19 and bolts 20, on which the nuts operate.

The reference character 21 designates the air release valve whereby the air within the body portion may be released, allowing the liquid to flow into the body portion.

A filtering member 15 is tapered toward the bottom of the body portion, providing a greater space between the filtering member and wall of the body portion, at the lower end of the filtering member, than at the top of the filtering member, thereby providing a substantially large compartment for the reception of the liquid, after the liquid has passed through the filtering member.

As clearly shown by the drawing, the bottom of the body portion, which is indicated by the reference character 22, is inclined towards the discharge spout 23, whereby the entire contents of the body portion may be drained therefrom.

In the use of the device, it is contemplated to remove the filtering member 15, when it becomes clogged, replacing the filtering member with a new or clean filtering member. The filtering member removed will, of course, be cleaned for further use, when the filtering member becomes clogged.

In this way it will be obvious that the filter may be employed for substantially continuous use, it being necessary to stop the filtering operation for only a short period of time, while the filtering members are being changed.

I claim:

A filtering device comprising a body portion having an outwardly disposed annular flange at the upper end thereof, said flange having a plurality of slots extending inwardly from the edge thereof, a cover for the body portion and having an outwardly extended annular flange formed with slots, resting on the first mentioned flange, the slots of the flanges registering, swinging bolts positioned in the registering slots, winged nuts on the bolts adapted to secure the cover in position, an annular flange depending from the cover and spaced from the cover, the last mentioned annular flange presenting a vertical wall, a filtering member secured to the last mentioned annular flange, a tubular member supported by the cover and communicating with the body portion, a pipe extending into the tubular member through which material is discharged into the filtering member, and a cover for the tubular member.

CRUTCHFIELD GATEWOOD.